US008925328B2

(12) United States Patent
Rodd et al.

(10) Patent No.: US 8,925,328 B2
(45) Date of Patent: Jan. 6, 2015

(54) GAS TURBINE STARTING PROCESS

(75) Inventors: Shervin Rodd, Chuluota, FL (US);
Adam M. Foust, Orlando, FL (US);
Gary V. Hildebrandt, Oviedo, FL (US);
Damien G. Teehan, St. Cloud, FL (US)

(73) Assignee: Siemens Energy, Inc., Orlando, FL (US)

( * ) Notice: Subject to any disclaimer, the term of this patent is extended or adjusted under 35 U.S.C. 154(b) by 1127 days.

(21) Appl. No.: 12/899,837

(22) Filed: Oct. 7, 2010

(65) Prior Publication Data
US 2011/0094241 A1    Apr. 28, 2011

Related U.S. Application Data

(60) Provisional application No. 61/254,862, filed on Oct. 26, 2009.

(51) Int. Cl.
*F02C 7/26*    (2006.01)
*F01D 19/00*   (2006.01)
*F02C 7/264*   (2006.01)
*F02C 9/26*    (2006.01)

(52) U.S. Cl.
CPC . *F01D 19/00* (2013.01); *F02C 7/26* (2013.01);
*F02C 7/264* (2013.01); *F02C 9/26* (2013.01);
F05D 2260/85 (2013.01)
USPC ............... 60/778; 60/776; 60/39.13; 60/786;
60/788; 60/39.281

(58) Field of Classification Search
USPC ................ 60/39.13, 776, 778, 786, 788, 790, 60/39.281
See application file for complete search history.

(56) References Cited

U.S. PATENT DOCUMENTS

| 4,010,605 | A | * | 3/1977  | Uram ............................ 60/790    |
| 4,314,441 | A |   | 2/1982  | Yannone et al.                              |
| 4,341,071 | A |   | 7/1982  | Abo et al.                                  |
| 5,103,629 | A | * | 4/1992  | Mumford et al. ............... 60/778       |
| 5,305,597 | A |   | 4/1994  | Snow                                        |
| 5,404,760 | A |   | 4/1995  | Robinson et al.                             |
| 5,428,275 | A | * | 6/1995  | Carr et al. ..................... 318/146   |
| 5,844,383 | A | * | 12/1998 | Denaci .......................... 318/139   |
| 6,035,626 | A | * | 3/2000  | Wahl et al. ..................... 60/773    |
| 6,062,016 | A | * | 5/2000  | Edelman ........................ 60/778     |
| 6,321,032 | B1|   | 11/2001 | Jones et al.                                |

(Continued)

FOREIGN PATENT DOCUMENTS

| EP | 0429840  | A1 | 6/1991  |
| EP | 0874144  | A2 | 10/1998 |
| WO | 03014551 | A1 | 2/2003  |

*Primary Examiner* — Phutthiwat Wongwian
*Assistant Examiner* — Steven Sutherland

(57) ABSTRACT

A starting process for a gas turbine (28) that holds the turbine speed of rotation at an ignition speed setting during an ignition window (58), with the ignition speed setting being based on ambient air conditions to achieve a specified combustor air mass flow rate (52). A fuel flow rate may be set based on the fuel type and temperature to achieve a particular air/fuel ratio in a combustor. The fuel flow rate may be adjusted during the ignition window and thereafter based on a combustor inlet air temperature (46). Completion of ignition may be determined by a reduction (68) in a blade path temperature spread (66). After ignition, fuel flow is increased to accelerate the turbine to full speed. At any point, the fuel flow may be reduced, or its increase may be slowed, to avoid exceeding a temperature limit in the turbine.

14 Claims, 5 Drawing Sheets

(56) References Cited

U.S. PATENT DOCUMENTS

| | | |
|---|---|---|
| 6,575,148 B1 * | 6/2003 | Bhargava et al. ............ 123/564 |
| 6,724,099 B2 | 4/2004 | Klaar |
| 6,766,647 B2 | 7/2004 | Hartzheim |
| 6,810,676 B2 * | 11/2004 | O'Connor ...................... 60/778 |
| 6,810,677 B2 * | 11/2004 | Dewis ............................ 60/778 |
| 7,166,984 B1 | 1/2007 | Jones et al. |
| 7,269,953 B2 | 9/2007 | Gadde et al. |
| 7,481,061 B2 | 1/2009 | Gadde et al. |
| 7,546,741 B2 * | 6/2009 | Sasao et al. .................... 60/778 |
| 2003/0110777 A1 | 6/2003 | O'Connor |
| 2007/0180831 A1 | 8/2007 | Bland |

* cited by examiner

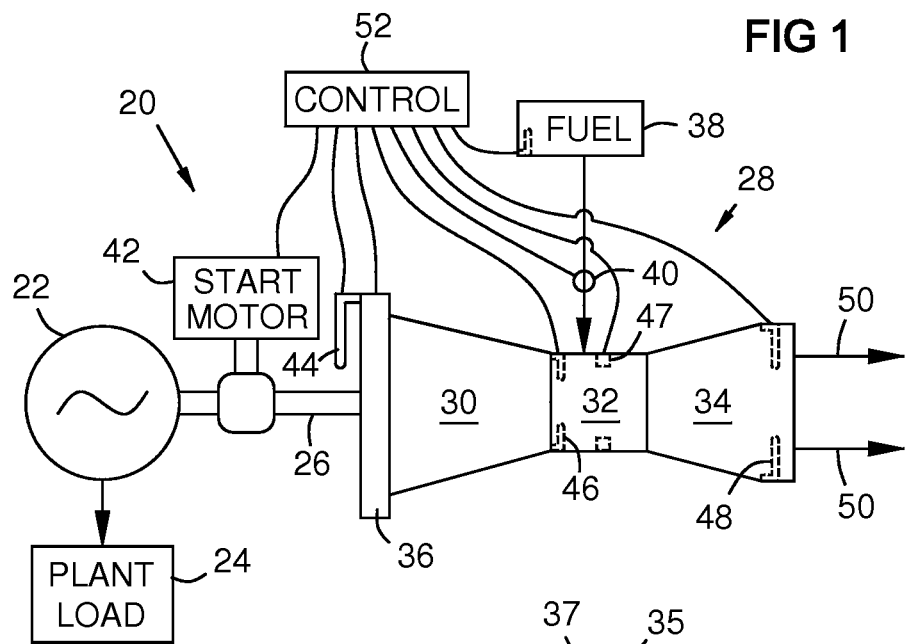
FIG 1
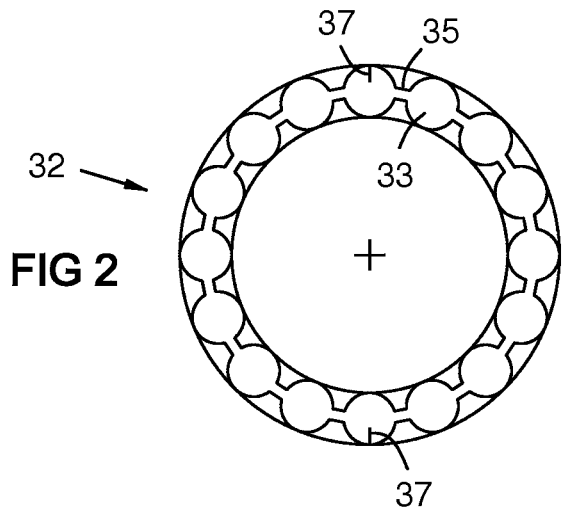
FIG 2
FIG 3
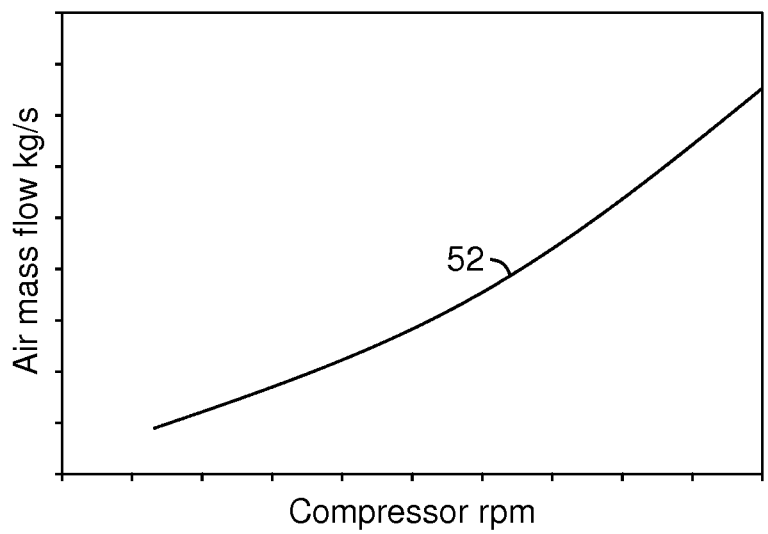

FIG 4

| Combustor air mass flow 0.75 kg/s | |
|---|---|
| Ambient pressure 14.7 psia | |
| Ambient temp. | Ignition speed |
| -18 C | 202 rpm |
| 10 C | 257 rpm |
| 15 C | 267 rpm |
| 38 C | 309 rpm |
| 66 C | 359 rpm |

FIG 5

| Combustor air mass flow 0.75 kg/s | |
|---|---|
| Ambient temp. 15 C | |
| Ambient press. | Ignition speed |
| 12.5 | 359 rpm |
| 13.0 | 336 rpm |
| 13.5 | 314 rpm |
| 14.0 | 293 rpm |
| 14.7 | 267 rpm |
| 15.0 | 255 rpm |

FIG 6

| Combustor air mass flow 0.75 kg/s | | | | | | |
|---|---|---|---|---|---|---|
| Ambient temp. | Ambient pressure in psia | | | | | |
|  | 12.5 | 13.0 | 13.5 | 14.0 | 14.7 | 15.0 |
| -18 C | ∼ | ∼ | ∼ | ∼ | ∼ | ∼ |
| 10 C | ∼ | ∼ | ∼ | ∼ | ∼ | ∼ |
| 15 C | 359 | 336 | 314 | 293 | 267 | 255 |
| 38 C | ∼ | ∼ | ∼ | ∼ | ∼ | ∼ |
| 66 C | ∼ | ∼ | ∼ | ∼ | ∼ | ∼ |
| Ignition speed rpm | | | | | | |

GAS TURBINE STARTING PROCESS

CROSS-REFERENCE TO RELATED APPLICATIONS

This application claims the benefit of U.S. Provisional Patent Application No. 61/254,862 filed on 26 Oct. 2009 and incorporated by reference herein.

FIELD OF THE INVENTION

This invention relates generally to a starting process for gas turbines, and in one embodiment to a process that sets an ignition speed based on ambient conditions to achieve a specified air mass flow rate, and holds the ignition speed during an ignition window while controlling the fuel flow rate to optimize the air/fuel ratio in the combustor section.

BACKGROUND OF THE INVENTION

A gas turbine (GT) has a narrow range of air/fuel ratios (AFR) that support stable ignition in the combustor(s) for reliable acceleration to operating speed. Gas turbines operate in a broad range of ambient conditions that affect the fuel and air mass flow rates and other ignition parameters. Attempts have been made to adjust for ambient conditions, especially as they affect the fuel, but startup failures still occur.

FIG. 9 shows a known stable region of gas turbine combustion over a range of air mass flow rates and a range of air/fuel ratios. Portions of this theoretically stable region can produce marginal stability in practice under variations in temperature and flow velocity in a given combustor. In addition, portions can produce combustion that exceeds combustor and/or turbine temperature limits.

Prior starting sequences have used a set GT ignition speed regardless of ambient conditions. Igniters are started, and then fuel flow is initiated and gradually increased until ignition occurs. This wastes fuel until an AFR is briefly reached that allows ignition, if at all. A non-optimum AFR is a common cause of failed starts.

An alternate technique per U.S. Pat. No. 6,766,647 is to continuously accelerate the GT with a starting motor, then start the igniters, then start and hold a constant fuel flow rate until ignition occurs. This has the same disadvantages as above, even if the startup acceleration rate and fuel flow rate are based on ambient conditions. Either of these techniques can overshoot the optimum AFR before all combustors in a can-annular cross-ignition configuration are ignited.

Cross ignition is a technique for igniting multiple combustors with fewer igniters. For example, two diametrically opposed combustors may each have one or two igniters. The remaining combustors receive flame from these two initiating combustors via interconnecting cross-fire tubes. This configuration provides igniter redundancy while minimizing the number of igniters. It takes a certain amount of time at a suitable AFR for the flame to propagate to all the combustors.

BRIEF DESCRIPTION OF THE DRAWINGS

The invention is explained in the following description in view of the drawings that show:
FIG. 1 is a schematic drawing of a gas turbine power plant as may incorporate the present invention.
FIG. 2 is a schematic sectional view of a can-annular combustion section, taken on a plane normal to the turbine axis.
FIG. 3 shows a quadratic curve that fits test data correlating GT rotation speed to air mass flow rate in a combustion section.
FIG. 4 is a table of ignition speeds that provide a given combustor air mass flow at a given ambient air pressure for various ambient temperatures.
FIG. 5 is a table of ignition speeds that provide a given combustor air mass flow at a given ambient air temperature for various ambient pressures.
FIG. 6 is a table of ignition speeds that provide a given combustor air mass flow for each of several ambient temperatures at each of several ambient pressures.

DETAILED DESCRIPTION OF THE INVENTION

Figure 7:
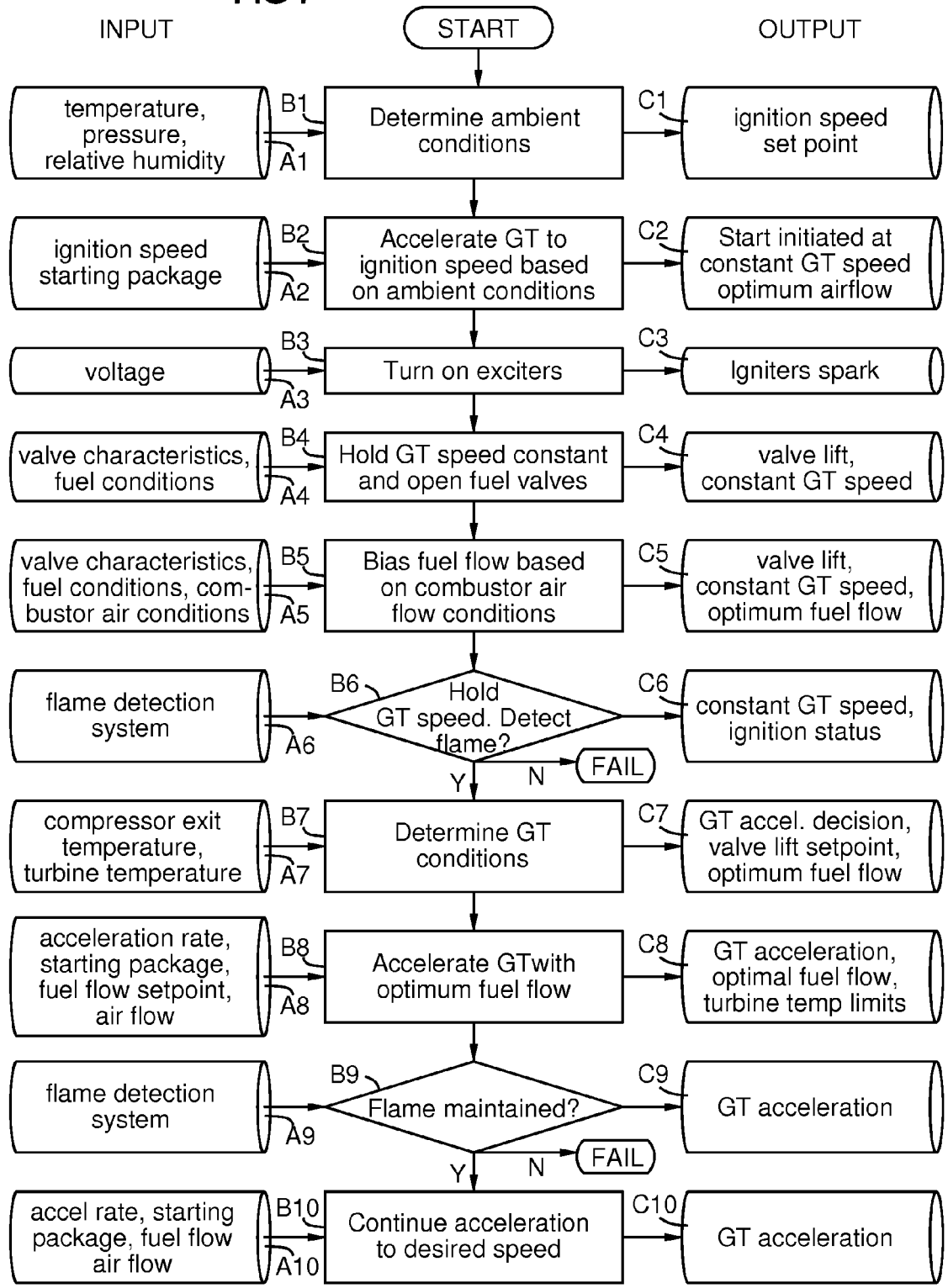
FIG. 7 is a flow chart of a GT starting sequence per aspects of the invention.

FIG. 1 shows a gas turbine power plant 20 with a generator 22 supplying a plant electric load 24. The generator is driven by a shaft 26 powered by a gas turbine engine 28. The gas turbine engine has a compressor 30, a combustion section 32, and a turbine 34. It may have adjustable inlet guide vanes 36. Fuel 38 is supplied to the combustion section via a valve 40. A start motor 42 may be connected to the drive shaft 26 via a clutch or other temporary engagement means as known in the art. Alternately, the generator 22 may be configured to operate as the starting motor, as known in the art. Ambient air sensors 44 may be attached on or near the compressor inlet to sense ambient air temperature and pressure, and optionally, humidity. Combustor inlet air sensors 46 may extend into an inlet area of the combustor section or into an exit area of the compressor 30. A flame scanner 47 may be located in each combustor 33 to provide an indication of the existence of flame in each respective combustor. Blade path temperature sensors 48 may extend into the path of combustion gases 50. A controller 52 receives inputs from sensors, and sends control signals to valves, motors, and actuators as known in the art. The controller may include one or more processors, in one or more locations with associated hardware and software as known in the art.

FIG. 2 is a schematic cross section of a can-annular combustor section 32, with a circular array of combustors 33, interconnected by cross-fire tubes 35, and having two igniters 37. A respective blade path temperature sensor 48 may be located downstream of each combustor 33 to provide a thermal indication of the existence of flame in each respective combustor. When all combustors are operating, the spread of temperatures among the blade path temperature sensors 48 is relatively low. When some, but not all, of the combustors are operating, the spread of temperatures among the blade path temperature sensors 48 is relatively high.

The blade path temperature spread may be defined as the difference between the average blade path temperature and the lowest individual blade path temperature. The blade path temperature sensors 48 may be installed just aft of the last row of turbine blades or at other locations in the combustion gas flow path. Additional sensors not shown may be located in critical areas of the gas turbine engine to monitor temperatures for comparison to limits.

FIG. 3 illustrates a correlation 52 between the rotation speed of the compressor 30 and the air mass flow rate in the combustor section 32. This relationship varies with ambient air conditions. It may be defined by operational testing and/or modeling for each of several inlet air temperatures and pressures and optionally humidity values. It may be recorded in the form of one or more tables, and/or by polynomials that are curve-fitted to the data. The illustrated curve 52 represents a quadratic curve that closely fits the test data for a given ambient condition (ISO 3977) in a given design of gas turbine. This curve provides a quadratic equation that computes the air mass flow rate (mdot) as a function of GT rotation speed (x).

$$mdot = ax^2 + bx + c \quad (1)$$

The coefficients a, b, and c are provided by the curve-fitting function. They depend on the design of the gas turbine engine and on the ambient air conditions. Equation (1) can be solved for the rotation speed as a function of mass flow rate using the quadratic formula.

$$x = \frac{-b + \sqrt{b^2 - 4*a*(c - mdot)}}{2*a} \quad (2)$$

Figure 9:
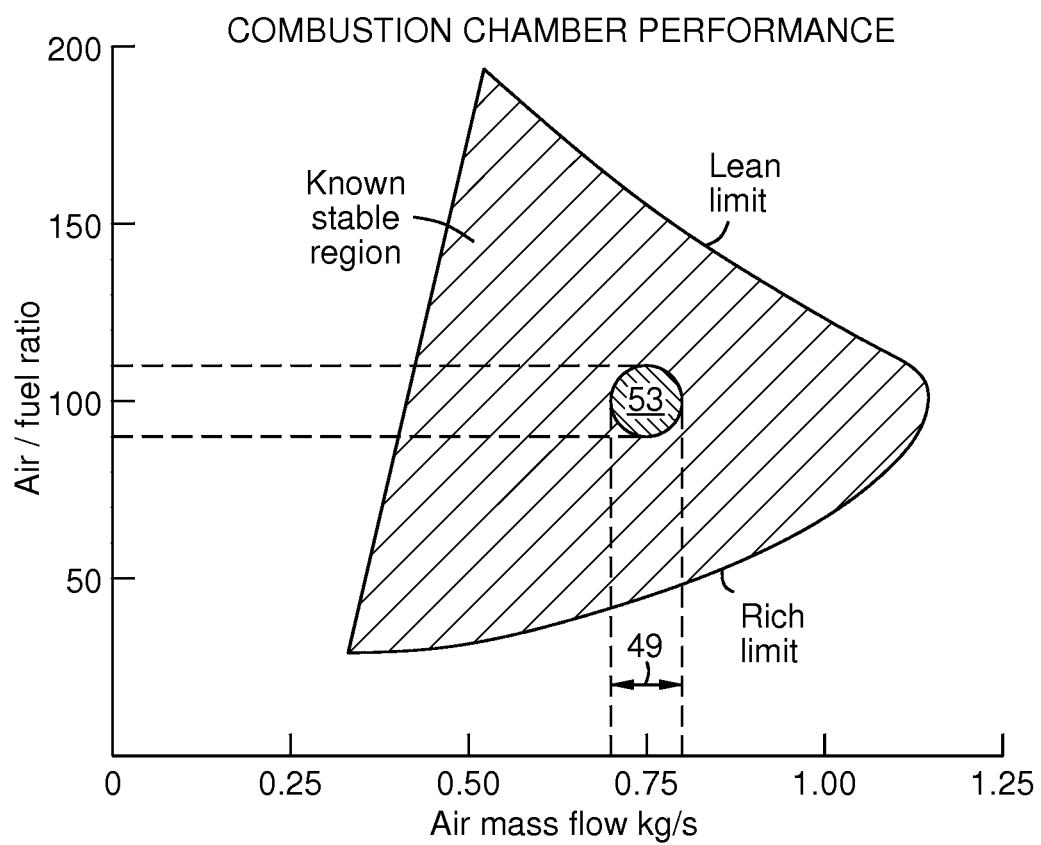
FIG. 9 shows a known stable region of gas turbine combustion and an optimum stable region per aspects of the invention.

A gas turbine combustor has an air mass flow and air-to-fuel ratio (AFR) at which stable ignition can occur. The air mass flow through the gas turbine is a function of ambient conditions, gas turbine speed and inlet guide vanes position. Therefore, initiating the gas turbine starting sequence based on ambient conditions provides a specified optimum air mass flow for starting reliability. The inventors recognized that existing starting methods based on the known stable region illustrated in FIG. 9 do not provide optimum starting reliability. Each combustor has a given cross sectional area. Therefore as air mass flow increases, the velocity of air through the combustor increases, and the stable range of AFR between the rich and lean limits is reduced. On the other hand, as air mass flow through the combustor decreases, it becomes increasingly difficult to maintain turbine temperatures within limits. Therefore, in the present invention an ignition window may be defined for any given combustor wherein a preferred mass flow rate for ignition is established and maintained within a desired close tolerance 49, for example, within ±7%, providing an optimum stable region 53 for ignition. This region 53 may be refined and narrowed to keep turbine temperatures within limits during the ignition window.

In the present process, the fuel flow rate is initially set to provide an optimum AFR based on a specified optimum air mass flow rate, the type of fuel, and the temperature of the fuel. A valve control signal is computed based on the fuel control valve characteristics and the desired fuel flow rate. For a given air mass flow, the air velocity through a given combustor varies proportionally to the air temperature in the combustor and inversely with the density of air in the combustor. The air velocity impacts the penetration of the fuel flow into the combustor basket. Therefore, further adjusting the fuel flow based on the combustor air inlet temperature provides an optimum fuel flow for a particular combustor to maximize starting reliability. Combustor inlet air temperature may be measured by sensors 46 in the combustor inlet or in the compressor exit. Fuel flow may be made relatively higher for less dense air conditions (i.e. warmer temperature or lower pressure) in order to enable the fuel to optimally penetrate the relatively higher velocity air flow through the combustor.

Failed starts occur when ignition or cross-ignition is not achieved in a combustor due to suboptimal air/fuel ratio. Therefore holding the GT speed constant until flame is detected in all combustors allows each combustor to ignite under constant, optimal air flow and fuel flow conditions, which maximizes starting reliability. Failed starts can also occur when turbine or exhaust temperature limits are exceeded. Therefore adjusting the fuel flow based on gas turbine temperature conditions can maintain turbine or exhaust temperatures below limits, and maximize starting reliability.

Air density decreases as temperature increases. Consequently the air mass flow through the compressor decreases as compressor inlet temperature increases. As engine speed increases, the air mass flow through the compressor increases. Therefore the GT ignition speed should be increased as compressor inlet temperature increases. Air density decreases as ambient pressure decreases. Therefore the GT ignition speed should be increased as ambient pressure decreases. Air density decreases as relative humidity increases. Therefore the GT ignition speed may be increased as relative humidity increases. However, the effect of varying humidity is small enough to be ignored if desired for certain embodiments.

The air mass flow rate (mdot) in kg/s can be calculated as follows:

$$mdot = \rho * A * V \quad (3)$$

$\rho$ = air density in kg/m$^3$
A = cross sectional area of flow path in m$^2$
V = air velocity in m/s The density of dry air in kg/m$^3$ can be calculated using the ideal gas law, expressed as a function of temperature and pressure, ignoring humidity:

$$\rho = P/(R*T) \quad (4)$$

R = the specific gas constant for dry air (287.05 J/(kg·K))
P = absolute air pressure in Pa
T = absolute air temperature in ° K.

FIG. 4 is a table of ignition speeds for a given air mass flow of 0.75 kg/s to a combustor at an ambient air pressure of 14.7 psia for a range of ambient temperatures. FIG. 5 is a table of ignition speeds for a given air mass flow of 0.75 kg/s to a combustor at an ambient air temperature of 15° C. for a range of ambient pressures. FIG. 6 is a table of ignition speeds for a given air mass flow of 0.75 kg/s to a combustor for each of several ambient temperatures at each of several ambient pressures. For clarity, only one row of the table of FIG. 6 is populated, which corresponds to the table of FIG. 5. The values in these tables are exemplary only. The tables may be populated from test data and/or computational data specific to each given gas turbine engine model. The tables may cover different ranges of ambient conditions, and may use different increments of the ambient conditions than those shown in these examples. One skilled in the art may appreciate that such tables or equivalent equations may be utilized in digital form as part of a controller 52 embodying the present invention.

FIG. 7 shows a sequence of steps for reliable GT starting as follows:

A1—Measure ambient temperature and pressure, and optionally humidity, via sensors 44 on or near the compressor inlet.

B1—Compute an ignition speed based on the ambient conditions A1.

C1—Establish an ignition speed setpoint for a starting package in the controller.

A2—Initialize the starting package.

B2—Accelerate or decelerate GT to the ignition setpoint.

C2—Reach and hold GT speed for ignition.

A3—Apply voltage to exciters.

B3—Operate exciters.

C3—Provide energy to Igniters.

A4—Input fuel valve characteristics and fuel conditions to controller.

B4—Calculate optimum valve lift per the conditions A4.

C4—Open fuel valves while holding GT speed constant.

A5—Input fuel conditions and combustor air conditions to controller.

B5—Compute fuel flow adjustment per the conditions A5.

C5—Adjust fuel valve lift per the computation B5 with GT speed constant.

A6—Input flame detection signals from sensors 47, 48.

B6—Hold GT speed. If full ignition is not detected in a given time, execute a failed start procedure as known in the art. If ignition is detected, proceed.

C6—Establish ignition status, for example using a temperature rise in the turbine or flame detection in the combustors.

A7—Input compressor exit temperature and critical turbine temperatures.

B7—Determine if compressor exit and turbine temperatures are within limits.

C7—Establish decision and conditions for GT acceleration.

A8—Compute fuel flow rates for acceleration.

B8—Accelerate GT with optimum fuel flow.

C8—Monitor GT acceleration rate, fuel flow, turbine temperatures.

A9—Monitor blade path temperatures and/or temperature spread and/or flame scanners.

B9—If flame is not maintained, execute a failed start procedure as known in the art. Otherwise continue GT acceleration.

C9—Accelerate GT.

A10—Monitor acceleration rate, fuel flow, air flow.

B10—Continue acceleration to desired speed.

C10—Accelerate GT to desired speed.

It is possible to hold a GT rotation speed constant at a specified ignition speed on some GT models, and not on others, depending upon the type of motor and control system used for starting. Ideally, the GT starting speed should be controllable in a continuously variable range to match the ignition speed calculations. It is recommended to bring the GT to a rotation speed within ±5% of the ignition speed, which defines a start of an ignition window, and to hold GT rotation speed constant to within ±7% of the calculated ignition speed, preferably within ±4%, during the ignition window and for a stabilization period after ignition is detected, such as about 10 seconds, in order to facilitate cross ignition in each combustor basket under optimum air/fuel ratio conditions. Alternately, or additionally, the GT acceleration may be limited to within ±2 rpm/s during the ignition window and/or the stabilization period.

Figure 8:
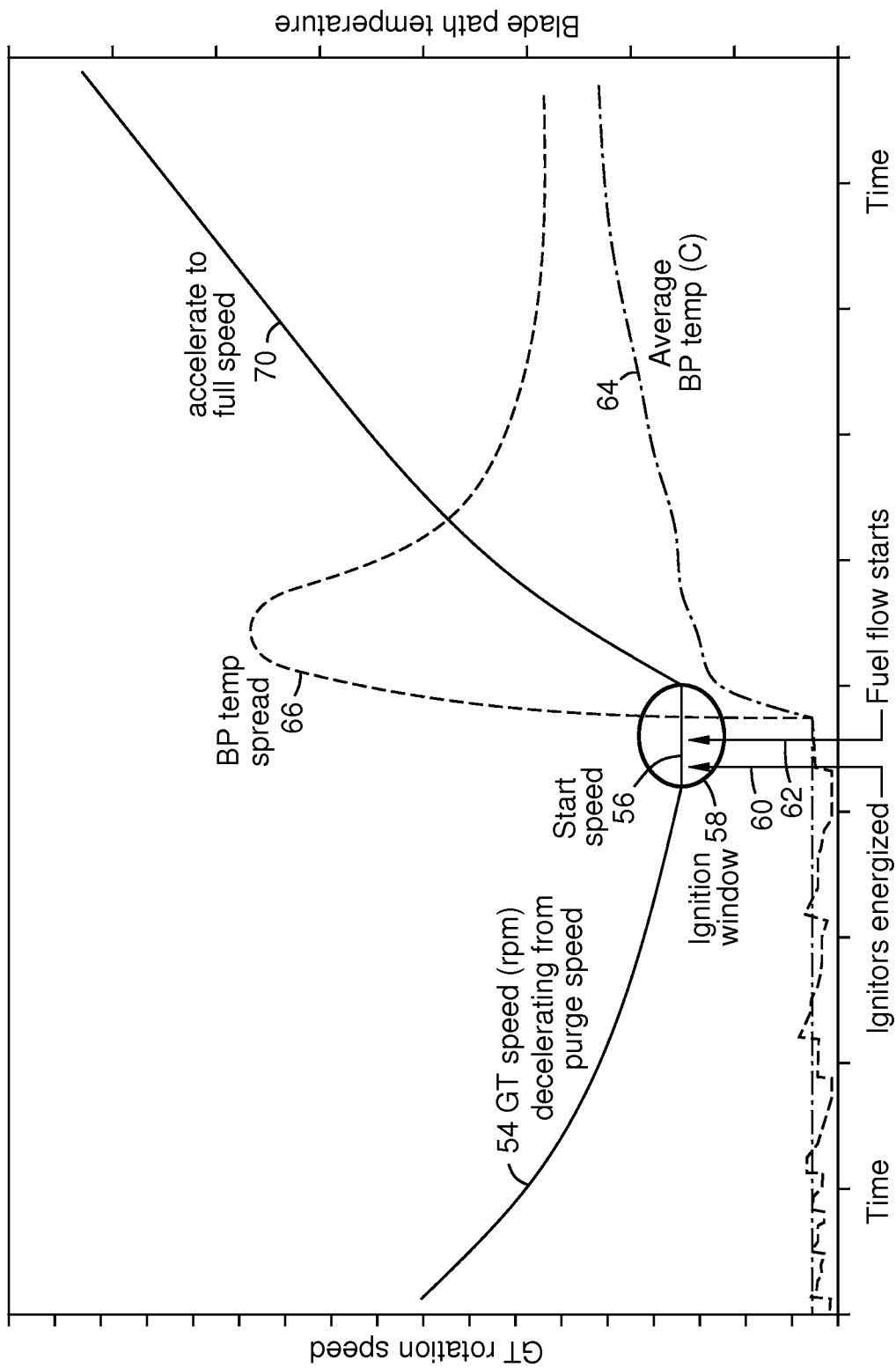
FIG. 8 is a graph of a GT starting sequence per aspects of the invention.

FIG. 8 is a graph of a GT starting sequence per aspects of the invention. The GT speed is indicated by the solid trace 54. An initial purge speed may be used to purge any unburned gasses from the GT. If so, the GT may decelerate from the purge speed to the starting speed 56 as shown. If a purge is not needed, the GT may accelerate from zero to the starting speed 56. When the GT rotation speed is within ±7% of the calculated ignition speed, an ignition window 58 opens, within which igniters are activated 60, and then an optimized fuel flow starts 62, based on fuel temperature and valve characteristics. Fuel flow may be adjusted based on the compressor exit temperature. In a can-annular arrangement with cross-ignition, an average blade path temperature 64 and a blade path temperature spread 66 (BPS) may initially rise together. The scale used in FIG. 8 for the blade path spread 66 is different than that used for the average blade path temperature 64 in order to show detail more clearly. When all combustors are lit, the BPS may fall significantly 68, and this may be used as an indication that ignition is complete. After a hold for stabilization, fuel flow is then increased to accelerate 70 the GT to full speed. Fuel flow may be continually adjusted based on the compressor exit temperature, and on temperature sensors elsewhere in the GT. For example, during the acceleration phase 70, the fuel flow rate may be reduced, or the increase in fuel flow may be slowed, based on one or more limits of temperatures sensed in the gas flow path of the GT. The blade path temperature 64 and/or the blade path temperature spread 66 and/or the flame scanners 47 may be monitored during acceleration to assure maintenance of flame in all combustors.

Testing of the present GT starting process was performed at a site with a previous 12 month rolling average starting reliability of 72.7% (24 successful starts; 9 failed starts, counting each re-try as a failed start). After implementing the present starting process, the starting reliability at this site was 100% (12 successful starts; 0 failed starts, 0 re-tries).

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for starting a gas turbine engine comprising:
determining an ignition speed for the gas turbine engine that produces a particular air mass flow rate in a combustion section of the gas turbine engine;
accelerating or decelerating the gas turbine engine to a rotation speed within ±5% of the ignition speed, which defines a start of an ignition window;
energizing at least one igniter in the combustion section of the gas turbine engine;
supplying a fuel flow to the combustion section of the gas turbine engine;
determining a completion of ignition in the combustion section, wherein said completion defines an end of the ignition window;
maintaining the rotation speed within ±7% of the ignition speed during the ignition window;
after the ignition window end, increasing the fuel flow to the combustion section to accelerate the gas turbine engine to an operating speed;
sensing ambient air conditions proximate a compressor inlet of the gas turbine engine; and
determining the ignition speed as a function of the ambient air conditions.

2. The process of claim 1, wherein the completion of ignition in the combustor section is determined by measuring temperatures detected among sensors spaced around an annular gas flow path of the gas turbine engine downstream of the combustor section.

3. The process of claim 1, wherein the ignition speed is computed in a controller by a table look-up function that uses a table of ignition speeds per ambient pressure per ambient temperature, wherein the table is populated with ignition speeds using data particular to a design of the gas turbine engine.

4. The process of claim 1, further comprising determining a fuel flow rate for the fuel flow within the ignition window based on a fuel type and a fuel temperature, and refining the ignition speed and the fuel flow rate effective to maintain temperatures in the gas turbine within limits during the ignition window.

5. The process of claim 4, further comprising determining the fuel flow rate based on a compressor exit air temperature or a combustor inlet air temperature.

6. A process for starting a gas turbine engine (GT) comprising the steps of:
- measuring an ambient air temperature and an ambient air pressure;
- determining an ignition speed of the GT based on the ambient air temperature and the ambient air pressure;
- accelerating or decelerating the GT to within ±5% of the ignition speed, which defines a start of an ignition window;
- providing ignition energy to a combustion section of the GT;
- supplying a fuel flow to the combustion section at a rate dependent on a fuel type and a fuel temperature to achieve a particular air/fuel ratio in the combustion section;
- holding the GT within ±7% of the ignition speed until detecting a completion of ignition, which defines an end time of the ignition window;
- increasing the fuel flow to accelerate the GT to a full speed; and
- adjusting the fuel flow to keep a turbine temperature in the GT within a limit.

7. The process of claim 6, wherein the ignition completion is determined by measuring temperatures detected among sensors spaced around an annular gas flow path of the gas turbine engine downstream of the combustor section.

8. The process of claim 6, further comprising holding the GT speed within ±7% of the ignition speed for a period of stabilization after the completion of ignition is detected.

9. The process of claim 6, further comprising limiting an acceleration of the GT within, the ignition window to within ±2.0 rpm/s.

10. The process of claim 6, further comprising holding the GT within ±4% of the ignition speed within the ignition window.

11. The process of claim 6, wherein the ignition speed is computed in a controller of the GT by a table look-up function using a table of ignition speeds per ambient pressure per ambient temperature, wherein the table is populated with ignition speeds using test data on a given model of the GT.

12. The process of claim 6, further comprising adjusting the fuel flow rate based on a compressor exit air temperature or a combustor inlet air temperature.

13. The process of claim 6, further comprising:
- sensing an ambient air humidity; and
- determining the ignition speed based on the ambient air humidity.

14. The process of claim 6, further comprising reducing the fuel flow, or slowing an increase of the fuel flow, based on said limit and said further temperature.

* * * * *